(12) United States Patent
Lyall, III et al.

(10) Patent No.: US 9,808,120 B2
(45) Date of Patent: Nov. 7, 2017

(54) COFFEE CONTAINER WITH FRESHNESS INDICATOR

(71) Applicant: Wilbur Curtis Company, Montebello, CA (US)

(72) Inventors: Lucian Hite Lyall, III, Rancho Santa Margarita, CA (US); Karol Zbigniew Renau, Calabasas, CA (US); Kevin Robert Curtis, Manhattan Beach, CA (US)

(73) Assignee: WILBUR CURTIS COMPANY, Montebello, CA (US)

( * ) Notice: Subject to any disclaimer, the term of this patent is extended or adjusted under 35 U.S.C. 154(b) by 165 days.

(21) Appl. No.: 14/271,267

(22) Filed: May 6, 2014

(65) Prior Publication Data

US 2014/0332433 A1 Nov. 13, 2014

Related U.S. Application Data

(60) Provisional application No. 61/821,164, filed on May 8, 2013.

(51) Int. Cl.

| | |
|---|---|
| *A47J 31/06* | (2006.01) |
| *G01F 23/26* | (2006.01) |
| *G08B 21/00* | (2006.01) |
| *B65D 85/00* | (2006.01) |
| *A47J 41/00* | (2006.01) |
| *A47J 31/50* | (2006.01) |

(52) U.S. Cl.
CPC ........... *A47J 41/0094* (2013.01); *A47J 31/50* (2013.01)

(58) Field of Classification Search
CPC ........ A47J 31/50; A47J 41/0094; A47J 31/44; A47J 31/56; A47G 19/14
USPC ................ 99/285, 342–344, 493; 206/459.1; 340/618, 620; 73/304 C
See application file for complete search history.

(56) References Cited

U.S. PATENT DOCUMENTS

| | | | | |
|---|---|---|---|---|
| 5,229,751 | A * | 7/1993 | Chandler | A47G 19/14 340/618 |
| 5,653,362 | A * | 8/1997 | Patel | A47J 41/0011 222/156 |
| 7,798,373 | B1 * | 9/2010 | Wroblewski | A47J 41/0033 222/1 |
| 2003/0012256 | A1 * | 1/2003 | Burkholder | A47J 41/0088 374/150 |
| 2003/0019367 | A1 * | 1/2003 | Fogagnolo | A47J 31/56 99/330 |
| 2008/0022858 | A1 * | 1/2008 | Murtagh | A47J 31/52 99/285 |
| 2008/0175963 | A1 * | 7/2008 | Pope | G01N 33/14 426/231 |
| 2013/0099685 | A1 * | 4/2013 | Zhang | H05B 33/0842 315/186 |
| 2013/0220143 | A1 * | 8/2013 | Fetterman | A47J 36/2405 99/330 |

* cited by examiner

*Primary Examiner* — Michael Hoang
(74) *Attorney, Agent, or Firm* — Fulwider Patton LLP

(57) ABSTRACT

A beverage server includes a removable lid with a display adapted to be viewed from a distance, the display equipped with LEDs that flash information to users with respect to a freshness and fluid level of a beverage in the server.

5 Claims, 5 Drawing Sheets

| MENU ITEM | LCD DISPLAY |
|---|---|
| Fresh Coffee Timer | 32 FSH |
| Count Up/Down Mode | 32 Cnt |
| Enable/Disable Display | 32 dSP |
| Factory Reset | rST |

FIG. 5

COFFEE CONTAINER WITH FRESHNESS INDICATOR

CROSS-REFERENCES TO RELATED APPLICATIONS

This application claims priority from U.S. Application No. 61/821,164, filed May 8, 2013 incorporated by reference in its entirety.

BACKGROUND

The coffee industry is well aware that time is the enemy of coffee after it is brewed when it comes to flavor. As brewed coffee sits, it begins to lose its flavor and turns either bitter or distasteful. For restaurants and commercial establishments that serve coffee to customers or clients, it is particularly necessary to ensure that only fresh coffee is served.

However, workers become busy with other tasks and do not always monitor how long brewed coffee sits, leaving stale coffee to be served to customers. Also, where more than one employee is tasked with brewing coffee, it becomes even harder to track when the coffee was brewed and how long the coffee has sat around before it is served. As a result, stale or unfresh coffee is served to customers on occasion, which is detrimental to the continued business of the establishment.

SUMMARY OF THE INVENTION

The present invention is a coffee server with a display that includes blinking LEDs to indicate the freshness of the coffee within, and provides status to employees and even customers as to the freshness of the coffee being served. Because blinking lights command so much more attention than a display readout, the present invention makes it much more likely that the signal will be seen and recognized. This also helps to prevent "old" coffee from being served to patrons.

BRIEF DESCRIPTION OF THE DRAWINGS

FIG. 5 is a table of display messages available to the display;

DETAILED DESCRIPTION OF THE PREFERRED EMBODIMENTS

Figure 1:
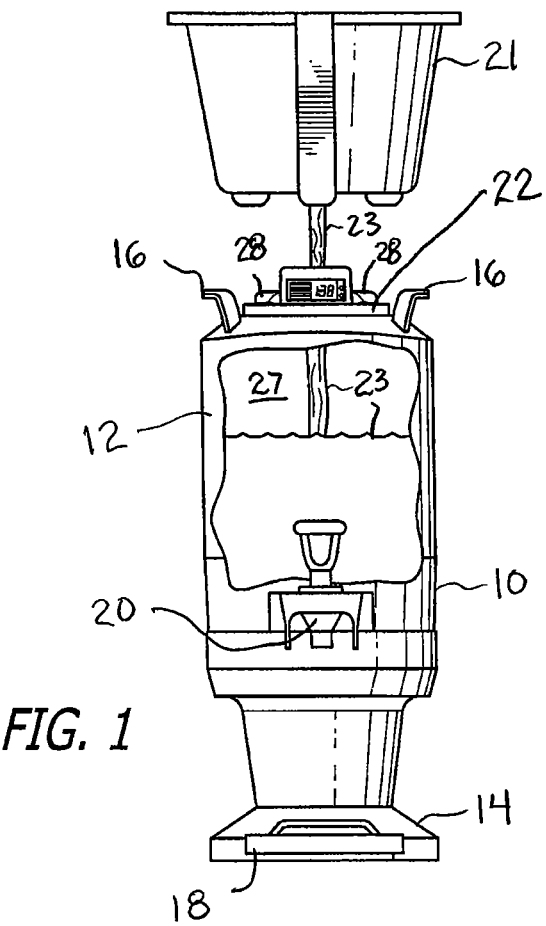
FIG. 1 is an elevated perspective view of a coffee server incorporating the present invention.

FIG. 1 illustrates a canister or coffee server 10 having a cylindrical body 12 resting on a base portion 14. The server 10 may include a pair of handles 16 that facilitate carrying the server, and a drip tray 18 is positioned below a spigot 20 that is used to dispense the coffee. Note that while the term "coffee" is used to designate the beverage therein, the invention is not so limited, and should be interpreted to include any hot beverage where freshness is of concern.

Figure 2:
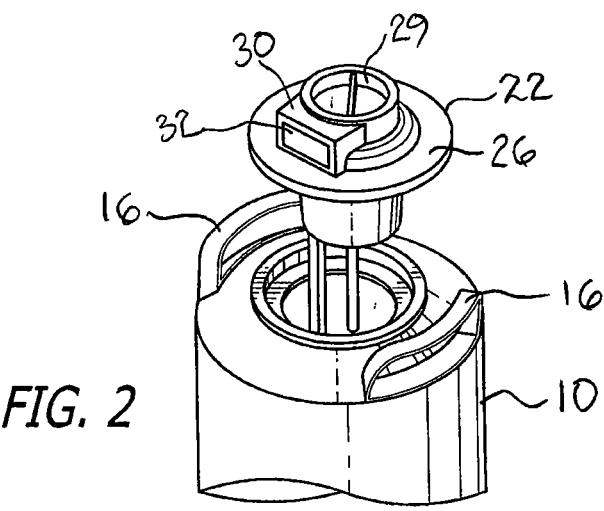
FIG. 2 is a front view of lid of the present invention having a display.

Mounted on top of the server is a lid 22, which can best be seen in FIG. 2. When the server is placed in a brewing station, the lid 22 is positioned below a brew basket 21 as is found in commercial coffee brewing machines where large amounts of coffee are brewed. Coffee 23 flows through a hole in the brew basket 21, though an opening in the lid 22, and into the internal reservoir 27 of the canister. It should be understood that the invention is not limited to the particular canister or application illustrated, and can be used in a variety of ways including bigger and smaller containers, different beverages, etc, The lid 22 has as a first function to seal the top of the canister 10 (also referred to as a "server"), so that coffee 23 may be poured into the canister 10 from a larger container or a brewing station, and then sealed with the lid 22. The lid 22 preferably includes a plug 29 that sits in an opening where coffee 23 can pass through from the brew basket 21 to the server interior 27. When coffee is filling the server 10, the plug 29 is removed. Once the filling operation is complete, the plug 29 is inserted into the hole to keep the coffee hot and prevent spillage during transportation of the server from the brewing station to the pouring location.

Figure 3:
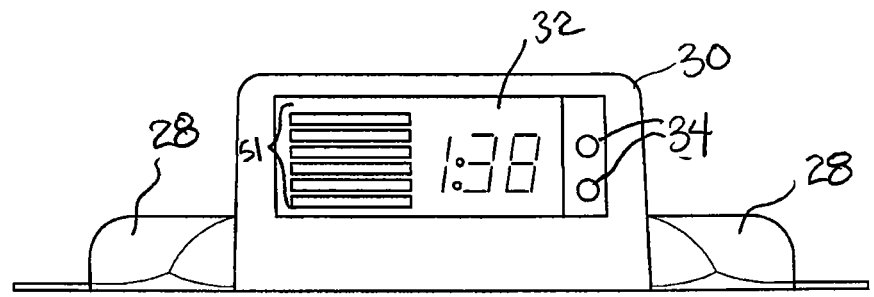
FIG. 3 is an enlarged, front view of the display.

The lid 22 is preferably formed with threads 24 that engage with mating threads at the opening 25 of the server 10 to provide a reliable and secure seal, and to prevent coffee from leaking during transport while reducing heat losses. The lid 22 has a disk-shaped body 26 that includes thumb plates 28 that are useful in opening and closing the lid 22. Seated on top of the disk body 26 is a housing 30 that includes a display 32 and two LED lights 34 as shown in FIG. 3. The LED lights 34, such as a green light and a red light, face forward at the front of the server 10 so that they can be viewed easily when the server located a distance from viewable traffic. It is to be understood that the number and color of the LEDs 34 are not critical to the invention, and other arrangements of lights can be used on the lid 22. Inside the housing 30 is a processor that is connected to the LEDs 34, and cause the LEDs to flash in predetermined patterns when the coffee begins to age. The predetermined patterns can be loaded into a permanent memory at the factory, or the patterns can be programmed by the user in an alternate embodiment to allow for different warnings, durations, etc.

One example of a pattern that can be used to indicate freshness of the coffee in the server 10 is having a green LED blink for a certain duration, and then have a red LED blink after a prescribed period has lapsed. This allows a user to quickly and easily determine if the coffee has been in the server 10 for less than the predetermined period (say, e.g., one hour). If the red LED is blinking, that means that the coffee in the canister is more than an hour old, and it may be time to brew some more coffee.

Alternatively, the LEDs 34 may blink to indicate more precisely how old the coffee is. For example, the green LED may have a single flash for fifteen minutes, a double flash for thirty minutes, a triple flash for forty-five minutes, etc. Once a certain limit is reached, the green LED may stop blinking altogether and the red LED may illuminate, indicating that the coffee is too old to serve. In a programmable version, the stem 40 may include a button or an area on the sensor that is sensitive to the thumb and forefinger that allows the user to select or increment the period by depressing the button is a series of selections. In other words, if the button is held for twenty seconds the processor goes into program mode indicated by both LEDs 34 flashing at once. Once in program mode, the button(s) can then be used to program the flashing green LED by pressing once for fifteen minutes, twice for thirty minutes, etc. Other programming modes and options are also available.

In yet another embodiment, the processor of the lid 22 can have a wireless transmitter 49 than communicates the condition of the coffee to a remote display (not shown). This feature can be particularly helpful to monitor large numbers of servers 10 at a central location, such as a counter or manager's office. The transmitter 49 can send freshness and beverage level information to the remote display, where it can be monitored along with other servers.

Figure 4:
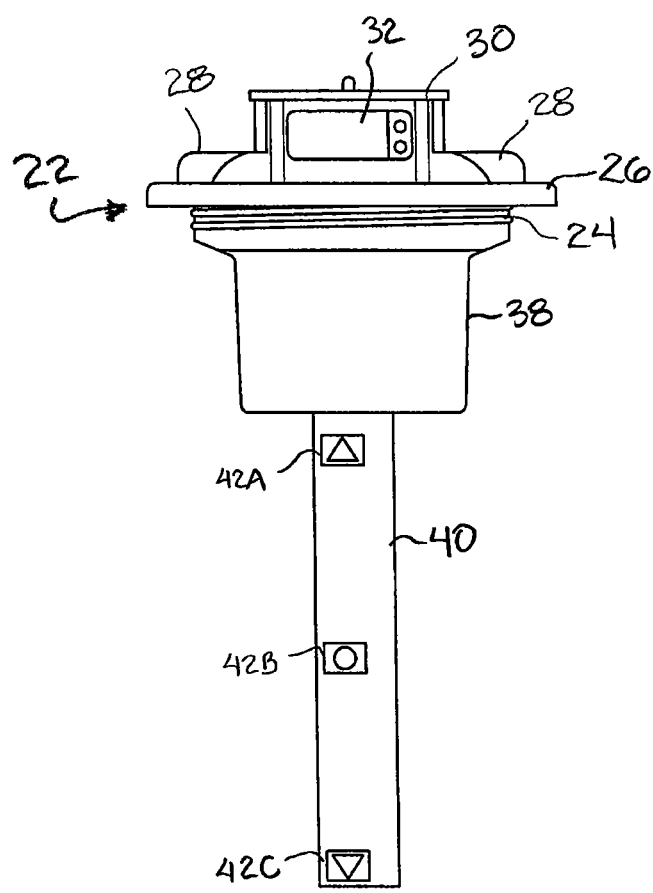
FIG. 4 is a front view of the lid and sensor mechanism.

As shown in FIG. 4, the lid 22 includes a cylindrical compartment 38 that encloses the electronics and processor 50, and stem 40 that extends downward from an underside of the compartment 38 into the coffee itself. The stem 40 is equipped with sensors 42 spaced vertically along the stem 40 for detecting the fluid level, where the sensors 42 are connected to the processor 50 which interprets the signals from the sensors 42 as a beverage fluid level. The sensors 42 may be spaced in close intervals to give a more precise reading, or it may have just three sensors to indicate full, half full, and empty. The processor 50 can also be equipped with a timer that resets every time the server 10 is filled with coffee, where the processor 50 uses the timer to determine an age of the coffee. The timer and processor 50 report the age of the coffee, along with the fluid level, using the LEDs 34 on the lid. The display 32 can also show a digital countdown of the freshness of the coffee, beginning at, for example "2:00" indicating two hours when the coffee is first brewed, down to "0:00" when the coffee freshness has expired. Therefore, at any time the display can be read by an employee to determine how long the coffee has been in the server 10.

The stem 40 measures the amount of coffee in the server 10 using sensors 42 that preferably operate on a conductance principle, where the presence of a fluid such as coffee has a higher conductance that the presence of air. By measuring the conductance at the sensor 42, the processor 50 in the lid 22, which receives signals from the sensors 42, can interpret the signals as a level of beverage. If the sensor 42c at the bottom of the stem 40 reads no beverage present, then the red LED can blink repeatedly to alert the persons tasked with server the canister that the server is empty.

Thus, between the timer and the level sensors 42, a coffee server or brewing station can include a freshness indicator that blinks LED lights, or other high intensity, low voltage lights, as an alert to those in proximity that a condition has occurred (either the coffee is stale or depleted) such that prompt action can be taken.

To use the lid 22 with the freshness indicator, the following procedure can be used.

1. Place the clean, empty server 10 centered under the brew basket 21 of the coffee brewer.
2. Fill brew basket 21 with ground coffee, and place it into the brewing apparatus.
3. Press the brew cycle button to start the brew cycle.
4. Allow the coffee brewer to complete the brew cycle, making sure that the brew basket 21 has drained completely before removing the coffee server 10.
5. The sensors 42 activate immediately, signaling to the processor 50 to initiate LED blinking pattern and countdown display.

LED lights 34 may be programmed to alert a user to a variety of conditions within the server 10. For example:

1. Wake Up Mode—When coffee starts flowing into the server, the LED lights blink alternating Green-Red-Green.

2. Coffee is Fresh—The green LED blinks every 12 seconds to designate the coffee in the server is fresh. The blinking green LED will continue for 50 minutes.

3. Warning Mode—Green and Red LED Lights alternately blink for 10 minutes.
  a. When the timer is 10 minutes or less from expiration; and/or
  b. When volume in the server is 24 oz. or less (+/−4 oz.).

4. Time Expired and/or Dispenser is (nearly) empty—The Red LED blinks every 12 seconds for 60 minutes when either of the conditions below are true:
  a. The Fresh Coffee time has expired; and/or
  b. The coffee dispenser is (nearly) empty—4 ounces or less.

5. The red LED will stop blinking and turn off after 60 minutes.

6. The timer will reset when the liquid level transitions from 0 ounces to 1 ounce, and when the server remains unchanged for at least 24 seconds at level 0.

The display 32 may include a digital numeric timer that may default to 2 hours, counting down. The user may control the settings, such as:

1. Timer adjustable from 1 to 4 hours, in 30 minute increments, where 2 hours is the default.
2. Changes to server's timer settings will be done via the capacitance stem.

To program the display 32, there may be located on the capacitance stem 40 three sensors 42, a top sensor 42A, a middle sensor 42B, and a bottom sensor 42C. The top sensor 42A may have the shape of an up arrow, the middle sensor 42B may have the word "Enter" or a circle, and the bottom sensor 42C may have the shape of a down arrow. To enter programming mode, the following procedure may be followed:

1. Lightly touch the "Up Arrow" and "Down Arrow" simultaneously for a minimum of 10 seconds. Wait for top and bottom level bars to be shown as acknowledgement, then release.
2. The whole display will blink ON for one second.
3. As each menu item is displayed, the factory default will be shown.
4. Touch "Down Arrow" or "Up Arrow" to cycle through the programming menu:
5. Touch "Enter" to select the menu item displayed on the screen.
6. Touch "Down Arrow" or "Up Arrow" to cycle through the available values for the selected item.
7. Touch "Enter" to save and exit programming mode. The display will show the current value for the programmed item.

The display will exhibit the particular mode that is being programmed, as shown in the table in FIG. 5, summarized below.

Fresh Coffee Timer (FSH): Upon entering this item, the LCD screen 32 will show the current countdown time; where two hours is the default. Using the up or down arrows, one may select any of seven choices: 1:00, 1:30, 2:00, 2:30, 3:00, 3:30 and 4:00. Select a time and press the enter to save and exit program.

Count Up or Down: This is displayed with the letters Cnt. One may use the up and down arrows on the capacitance stem 40 to display Count Up or Count Down. Count down is the default. Count Down is displayed as a group of dots or bars 51 (also referred to as the liquid level bars) forming a wedge shape, pointing downward. Count Up is shown as a wedge pointing up. When the desired shape is displayed, press enter to save and exit program.

Display options: This is shown with the letters dSP in the menu items. The two LEDs, the liquid level bars 51, or the LCD Fresh Coffee Timer can all be turned on (enabled) or turned off (disabled) individually. Press enter to save and exit program.

Reset (rST): Selecting rST will return all settings to the factory defaults.

Figure 6:
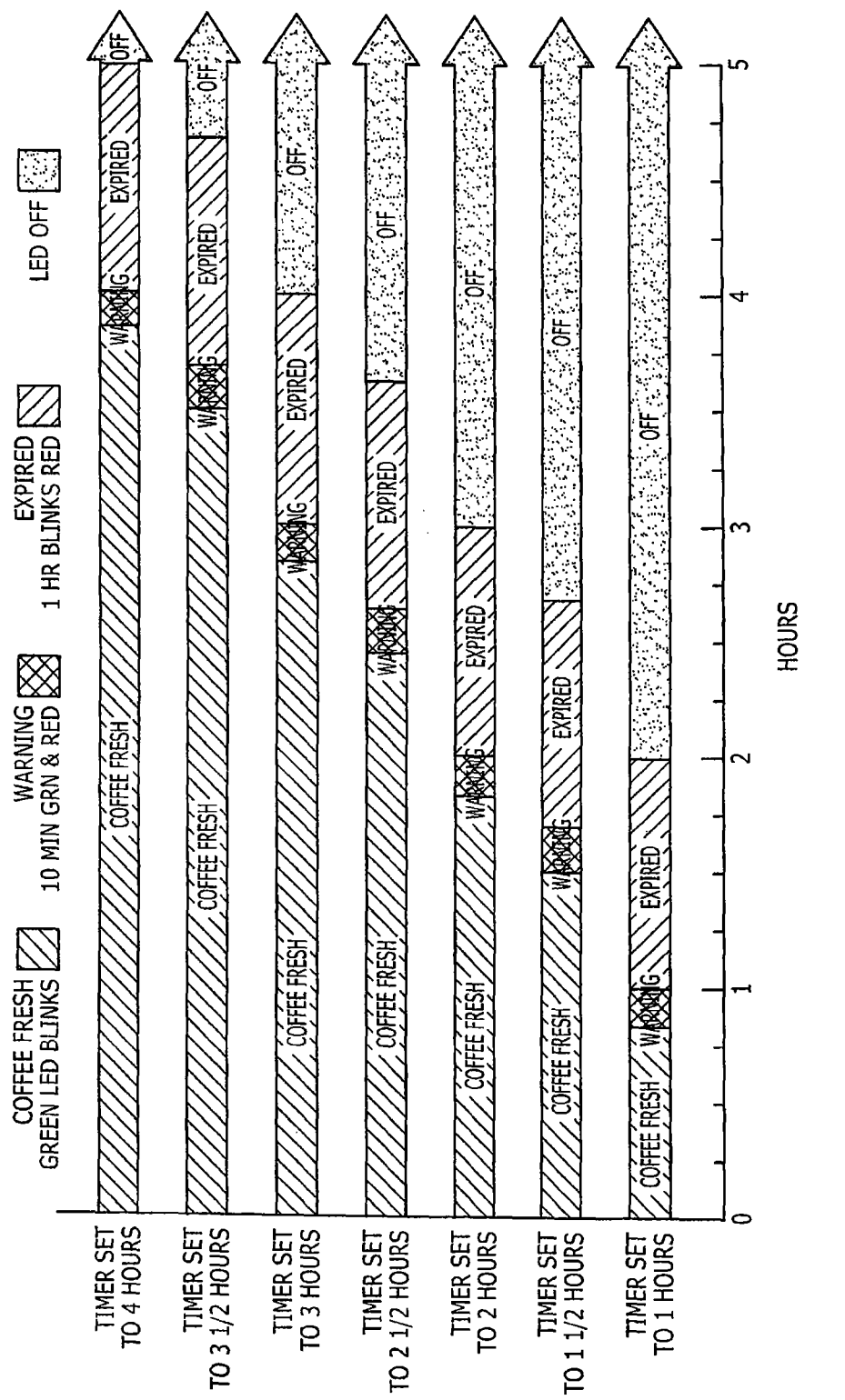
FIG. 6 is a diagram illustrating the information and signal patterns of the display.

Program Time Out: If, at any stage, no operator input is received within 30 seconds, the capacitance stem will exit programming mode without FIG. 6 illustrates a chart showing the various conditions that may be signaled to a user. For example, the first bar shows green LED illuminated or flashing for the first three hours and fifty minutes, followed by a ten minute warning indication of red and greed LED flashing, followed by one hour of red LED flashing indicating the beverage is beyond the acceptable serving age. The bottom bar shows a green LED illuminated or flashing for fifty minutes, followed by ten minutes of mixed red and green LED warning, followed by one hour of flashing red LED indicating "old" beverage. After one hour, the red LED will turn off. Various other settings are also illustrated in the graph, and the graph is not encompassing but rather illustrates several of many examples of programming of the present invention.

Figure 7:
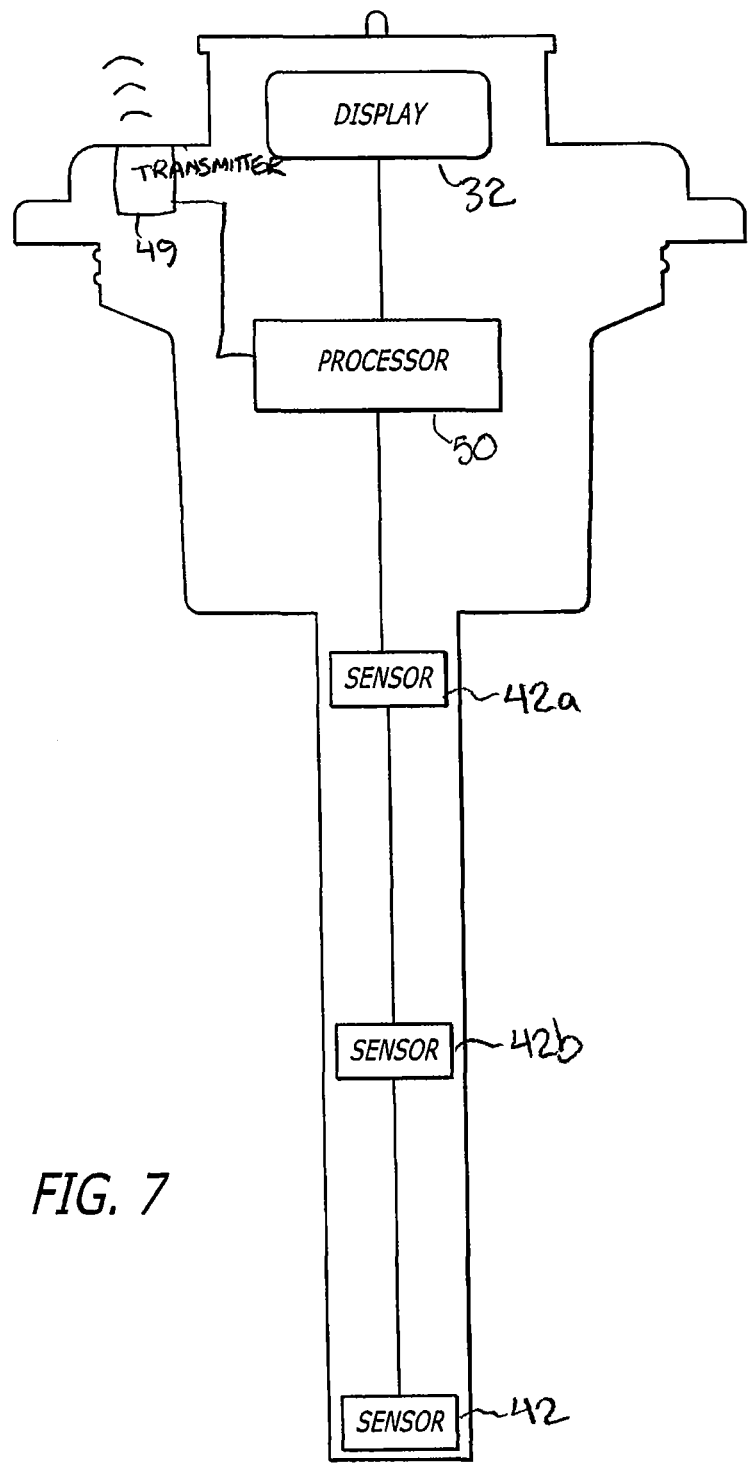
FIG. 7 is a schematic showing the lid and sensor mechanism components.

FIG. 7 illustrates a basic diagram of the components of the system, including a processor 50 that controls a display 32 and a remote transmitter 49. The processor receives input from a plurality of sensors 42, which can also be used to program the processor and the display readout. The display is equipped with LEDs, preferably of multiple colors, which can be used to signal a user when the sensors 42 indicated that the freshness of the coffee or beverage has expired.

The foregoing description is intended to be illustrative but not limiting in the scope of the present invention. It is to be understood that one of ordinary skill in the art would be aware of various modifications and alterations to the present invention, and the scope of the invention is intended to include all such modifications and alterations. Therefore, the scope of the present invention should be consistent with the words of the appended claims, using their ordinary and customary meanings consistent with, but not limited by, the descriptions and illustrations herein.

We claim:

1. A beverage server, comprising:
   a body defining a reservoir for receiving a beverage, the body including an opening at an upper portion;
   a lid removably securable within the opening of the body, the lid including a disk-shaped body extending radially beyond the opening and having thumb plates extending from an upper surface, a housing seated above the disk-shaped body including a vertical display and first and second LED lights, a centrally disposed vertical passage through which the beverage enters, a plug inserted into and received within said vertical passage, and a cylindrical compartment below the disk-shaped body and extending downwardly therefrom, the cylindrical compartment disposed below a threaded engagement between the lid and the reservoir and seated inside the reservoir;
   a microprocessor, the cylindrical compartment enclosing the microprocessor below the disk-shaped body;
   a downwardly disposed stem projecting from an underside of the cylindrical compartment to a bottom of the reservoir, the downwardly disposed stem including a plurality of vertically spaced liquid detecting capacitive sensors, the sensors communicating a detected fluid level to the microprocessor;
   the capacitive sensors further serving as manual input devices having indicia thereon for indicating a function of an input, the manual input devices connected to the microprocessor to control a timer displayed by the vertical display and to program the display;
   whereby the vertical display communicates a liquid level and duration of the beverage in the reservoir; and
   whereby the vertical display further includes level bars conveying a liquid level in the reservoir.

2. The beverage server of claim 1, wherein the microprocessor can be programmed by a user by depressing the sensors on the stem to select a predetermined pattern of the first and second LED lights.

3. The beverage server of claim 2, wherein the display further comprises a numerical display to measure a duration of viability of a beverage determined by a duration since brewing.

4. The beverage server of claim 1, further comprising a transmitter for transmitting to a remote receiver data from the microprocessor corresponding to a fluid level in the server.

5. The beverage server of claim 1, further comprising a transmitter for transmitting to a remote receiver data from the microprocessor corresponding to a duration that a beverage has been inside of the server.

\* \* \* \* \*